(12) United States Patent
Nola

(10) Patent No.: US 10,199,803 B2
(45) Date of Patent: Feb. 5, 2019

(54) BALL STUD STRATEGY FOR HAND-REPLACEABLE COMPONENTS REQUIRING ELECTRIC POWER

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/621,057

(22) Filed: Jun. 13, 2017

(65) Prior Publication Data

US 2018/0358783 A1 Dec. 13, 2018

(51) Int. Cl.
| | | |
|---|---|---|
| *F02B 77/02* | (2006.01) | |
| *H01T 13/18* | (2006.01) | |
| *H01T 13/06* | (2006.01) | |
| *F02D 41/30* | (2006.01) | |
| *F02B 63/02* | (2006.01) | |
| *F02B 77/11* | (2006.01) | |

(Continued)

(52) U.S. Cl.
CPC .............. *H01T 13/18* (2013.01); *F02B 63/02* (2013.01); *F02B 77/11* (2013.01); *F02D 41/3005* (2013.01); *H01T 13/06* (2013.01); *F02F 2007/0041* (2013.01); *F16C 11/06* (2013.01); *F16C 2326/01* (2013.01)

(58) Field of Classification Search
CPC ......... H01T 13/18; H01T 13/06; F02B 63/02; F02B 77/11; F02D 41/3005; F02F 7/0082; F02F 2007/0041; F16C 11/06; F16C 2326/01; B60Q 1/2615; B60Q 1/2623; B60Q 1/263; B60Q 1/2696
USPC ...... 123/198 E, 195 C, 143 C, 647; 362/611, 362/612, 630, 631, 632, 459, 496
See application file for complete search history.

(56) References Cited

U.S. PATENT DOCUMENTS

| | | | |
|---|---|---|---|
| 4,443,832 A | * | 4/1984 Kanamori | ................ B60Q 1/26 362/311.13 |
| 6,528,746 B2 | | 3/2003 DeWitt et al. | |

(Continued)

FOREIGN PATENT DOCUMENTS

JP 2005513365 5/2005

*Primary Examiner* — Hai Huynh
(74) *Attorney, Agent, or Firm* — LeClairRyan

(57) ABSTRACT

A conductive ball stud fastener arrangement for providing energy to a removable electrified component having an electrified element when the component is attached to an electrified substrate is disclosed. The ball stud fastener includes an insulating body, an electrified conductor having a conductive tip that is continuous with a conductive, centrally formed conductive stem, and a conductive attachment portion for attachment to the electrified substrate. The electrified component includes grommets having conductive elements. The ball stud fasteners are easily removed from and attached to the grommets. The conductive elements of the grommets are part of a circuit to which the electrified element of the electrified component is attached. According to one embodiment, the conductive ball stud fastener arrangement and its associated circuit includes a photoelectric sensor that opens and closes the circuit. In another embodiment, the ball studs themselves act as switches to open and close the circuit.

19 Claims, 3 Drawing Sheets

(51) Int. Cl.
*F16C 11/06* (2006.01)
*F02F 7/00* (2006.01)

(56) References Cited

U.S. PATENT DOCUMENTS

| | | | | |
|---|---|---|---|---|
| 7,866,858 B2* | 1/2011 | Hirzmann | ............ | B60R 13/005 |
| | | | | 362/487 |
| 8,113,695 B2* | 2/2012 | Meinke | ................ | B60Q 1/2669 |
| | | | | 362/214 |
| 8,246,226 B2* | 8/2012 | Stempinski | ............. | B60Q 1/50 |
| | | | | 362/496 |
| 8,382,531 B2 | 2/2013 | Astola | | |
| 8,449,161 B2* | 5/2013 | Igoe | .................... | B60R 13/0243 |
| | | | | 362/487 |
| 9,050,937 B2* | 6/2015 | Gong | ........................ | B60Q 1/56 |
| 9,481,296 B2* | 11/2016 | Roberts | ................ | B60Q 1/2615 |
| 2005/0013140 A1* | 1/2005 | Currie | ..................... | B60Q 1/32 |
| | | | | 362/495 |
| 2006/0029461 A1 | 2/2006 | Benick et al. | | |
| 2008/0025038 A1* | 1/2008 | Chiang | ................ | B60Q 1/0005 |
| | | | | 362/547 |
| 2012/0144705 A1* | 6/2012 | Pierce | .................. | B60R 13/005 |
| | | | | 40/582 |
| 2012/0182722 A1* | 7/2012 | Wu | ...................... | B60R 13/005 |
| | | | | 362/157 |
| 2012/0294004 A1 | 11/2012 | Stathis et al. | | |
| 2012/0326465 A1* | 12/2012 | Harting | ................. | B60J 1/2005 |
| | | | | 296/97.5 |
| 2013/0335997 A1* | 12/2013 | Roberts | .................. | G09F 21/04 |
| | | | | 362/583 |
| 2014/0313721 A1 | 10/2014 | Morgan | | |

* cited by examiner

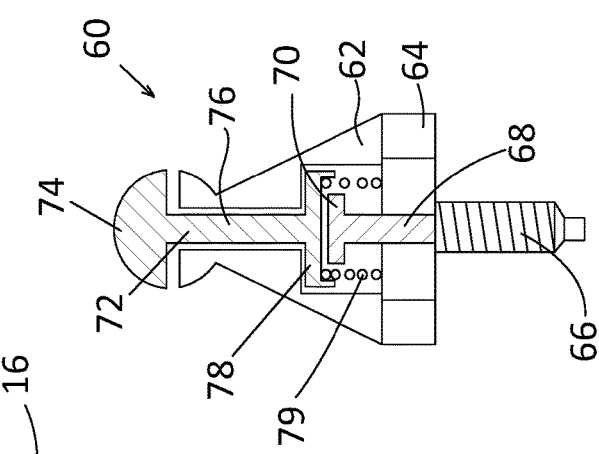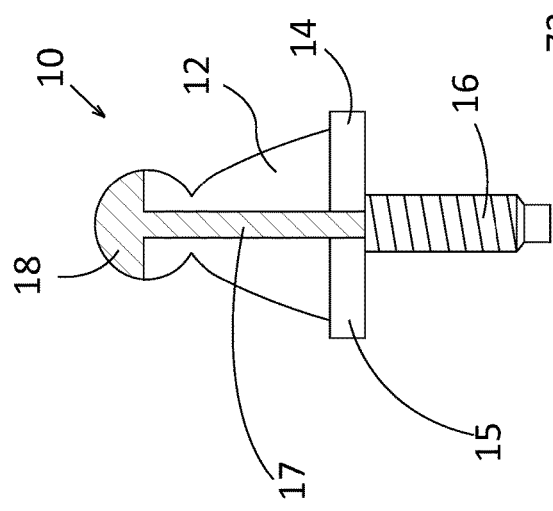

BALL STUD STRATEGY FOR HAND-REPLACEABLE COMPONENTS REQUIRING ELECTRIC POWER

TECHNICAL FIELD

The disclosed inventive concept relates generally to conductive mechanical connectors for releasable attachment of components. More particularly, the disclosed inventive concept relates to a conductive ball stud strategy for use with hand-replaceable components that require electric power for operation. Two embodiments of the ball stud strategy of the disclosed inventive concept are set forth. One embodiment of the disclosed inventive concept incorporates a conductive ball stud having a conductive tip associated with an electric circuit having a photoelectric switch that de-energizes the circuit if the component is removed. Another embodiment of the disclosed inventive concept incorporates a conductive ball stud having a built-in safety switch and an associated electric circuit that is de-energized when the safety switch is moved to its open position.

BACKGROUND OF THE INVENTION

A number of components attached to an automotive vehicle require an electric circuit. Some components, such as a side mirror, rarely require servicing and thus may be fixed to the vehicle by permanent fasteners and hardwired to the vehicle's power system by, for example, a wire harness. However, in other instances, it is desirable to have an alternative approach to electrified components that require removal to provide proper servicing to the vehicle.

One such component is included in the vehicle's engine compartment. The engine compartment of the modern vehicle has an appearance that is quite different from that of its predecessors. For decades following the introduction of the motor vehicle, the engine compartment was generally ignored by designers who, instead, focused on the exterior and interior of the vehicle. The engine compartment of the production vehicle (as opposed to the show vehicle) was solely functional.

Show vehicle enthusiasts have taken the appearance of the engine compartment and the engine cover to another level. In some cases, the engine compartment is illuminated with lighting elements, such as LEDs, being arranged along the firewall, the side walls, and the radiator to highlight different features of the engine and adjacent components. Such illumination sometimes includes the engine cover itself which is fitted with lighting elements, again such as LEDs, to define a pattern or to illuminate a badge typically fitted to the top side of the engine cover.

To energize the illuminated engine cover and, in particular, the illuminated badge, wiring between the power source and the badge itself is necessary. Typically this wiring is in the form of exposed wires and, despite the creative efforts of the installer, the wires typically remain exposed and unattractive. While known arrangements for providing illuminated badging to the engine cover provide a certain degree of satisfaction to underhood appearance specialists, the challenge of hiding the wiring necessary to energize the illuminated badging still remains. Complicating the challenge is the need to contain the wiring substantially within the engine cover itself in order to avoid not only the unsightly appearance of exposed wiring but also to improve engine safety by minimizing the risk of engine compartment fire due to stray wiring. A further complication is the occasional need to remove the engine cover completely when undertaking certain service operations. Hard wired engine cover lighting serve only to interfere with the removal of the engine cover. A greater challenge is to combine the electrification of the electrified component with a quick and easy way to remove and reattach the electrified component to the engine.

Accordingly, a common challenge for the custom car enthusiast is the need to combine functionality and serviceability with aesthetics in the engine cover having an illuminated badge. Consideration must therefore be given to ease of installation to maintain competitive assembly costs and ease of removability to maintain competitive repair costs. In addition to satisfying these requirements, the wiring necessary to illuminate the badge of the engine cover must also be simple, relatively light weight, inexpensive to produce, and integrated entirely within the cover itself.

As in so many areas of vehicle technology there is always room for improvement related to the design of engine covers having illuminated badging and to their methods of installation.

SUMMARY OF THE INVENTION

The disclosed inventive concept overcomes the problems associated with current approaches to providing power to removable vehicle components while making the component easy to remove and reinstall. The disclosed inventive concept provides a conductive ball stud fastener arrangement that provides energy to the electrified component having an electrified element such as an illuminated badge while also enabling the component to be readily removed and reinstalled as may be needed to provide proper servicing to the underlying substrate.

The conductive ball stud fastener arrangement of the disclosed inventive concept is provided in two embodiments. Common to both embodiments is a ball stud fastener having an insulating body that preferably has a hexagonal base to enable attachment of the ball stud fastener to a substrate, an electrified conductor that includes a conductive tip that is continuous with a conductive, centrally formed conductive stem, and a conductive attachment portion for attachment to the electrified substrate. The conductive attachment portion may be either a free running fastener or may be a thread-forming screw. The electrified component includes grommets having conductive elements. The ball stud fasteners are readily removed from and attached to the grommets. The conductive elements of the grommets are part of a circuit to which the electrified element (such as an illuminated badge) of the electrified component is attached.

According to one embodiment of the disclosed inventive concept, the conductive ball stud fastener arrangement includes a conductive ball stud fastener having a fixed conductive tip attached to the conductive stem and the conductive attachment portion. The substrate includes a circuit having a power source, a hood switch (to indicate if the engine hood is open or closed), and a photoelectric sensor that opens the circuit when the electrified component is removed from the substrate and closes the circuit when the electrified component is reattached, thus reenergizing the electrified element. Thus according to this embodiment, the circuit is de-energized by the photoelectric sensor upon removal of the electrified component.

Alternatively, the circuit may be de-energized by the ball stud fasteners themselves according to an alternative embodiment of the disclosed inventive concept. According to the alternative embodiment, an axially movable conductive tip assembly is movable within the stud body and includes a conductive tip attached to a conductive stem having a movable contact plate. The axially movable conductive tip assembly is movable between a circuit completing position and a circuit interrupting position. A spring provides a biasing force that maintains the axially movable conductive tip assembly in its out-of-contact, circuit interrupting position. Upon attachment of an electrified component, the biasing force of the spring is overcome, the movable conductive tip assembly is moved to its circuit completing position, and the circuit between the power source supplied by the substrate and the electrified element is complete.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is a sectional view of a conductive ball stud fastener according to an embodiment of the disclosed inventive concept;

FIG. 3 is a sectional view of a conductive ball stud fastener according to another embodiment of the disclosed inventive concept.

DETAILED DESCRIPTION OF THE PREFERRED EMBODIMENT

Figure 2:
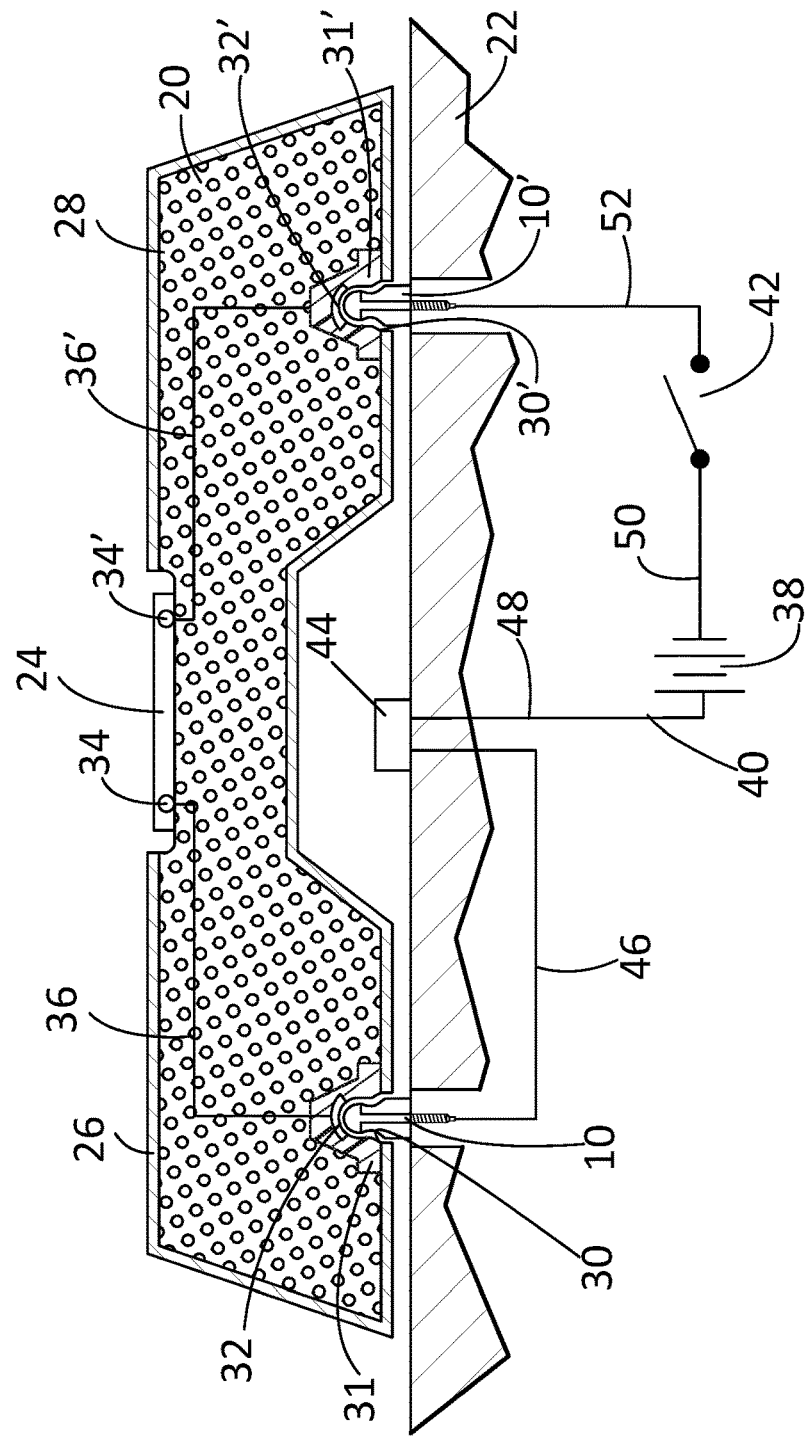
FIG. 2 is a sectional view of a removable electrified component incorporating the conductive ball of FIG. 1 a circuit.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate embodiments of a conductive ball stud fastener for use with a removably attachable electrified component. The component may be any of a broad variety of electrified components for attachment to and removal from a substrate that is also a power supply. It is to be understood that the shape and size of the ball stud fasteners and the associated electrified component as illustrated in the figures are suggestive and are not intended as being limiting. As a non-limiting example, the illustrated shape of the ball stud may instead be elongated or squared and may be adapted in any of several ways as needed for application in a certain receptacle of the electrified component.

Figure 4:
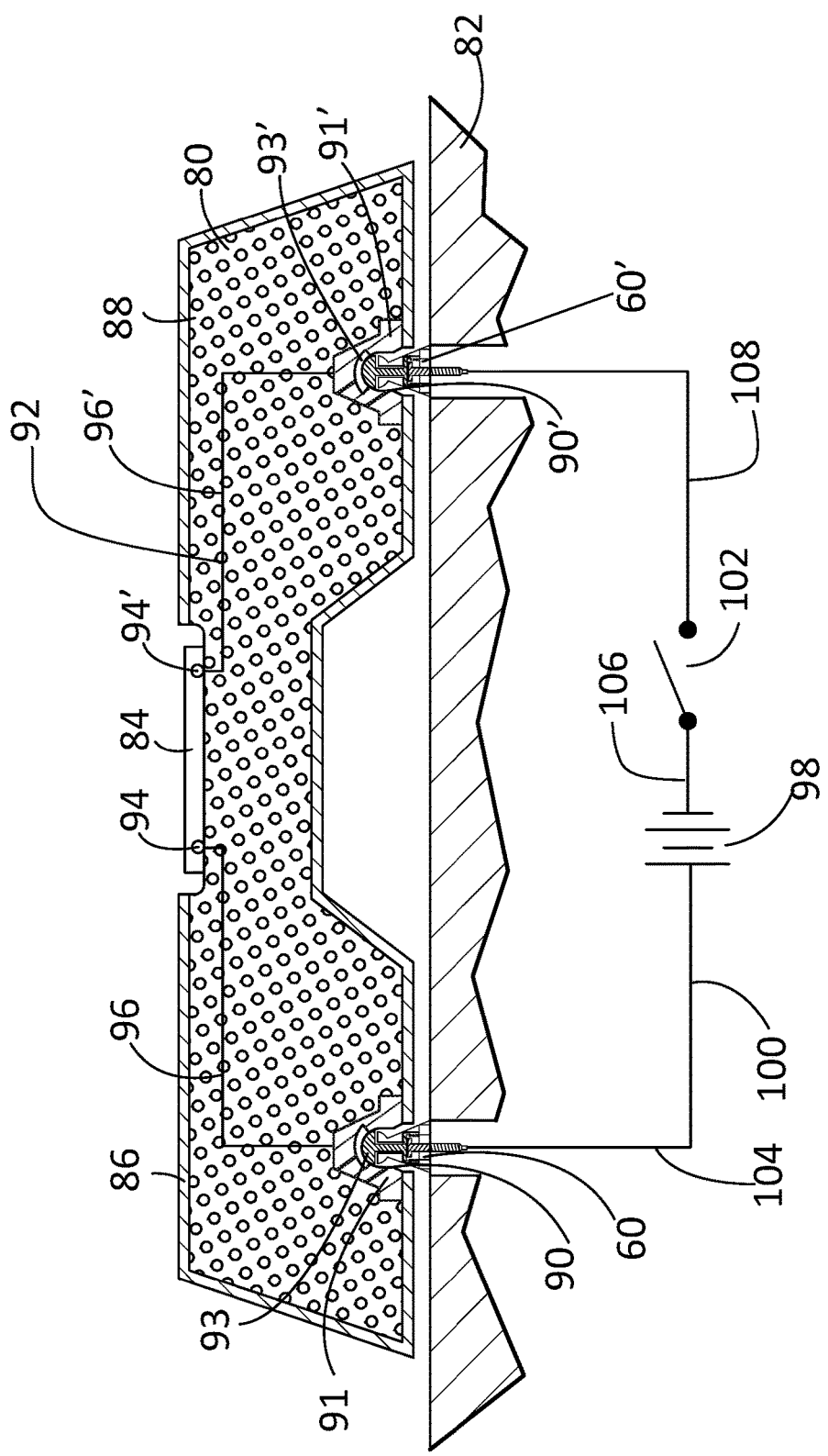
FIG. 4 is a sectional view of a removable electrified component incorporating the conductive ball of FIG. 1 a circuit.

FIGS. 1 and 2 illustrate the first of two embodiments of the disclosed inventive concept for a conductive ball stud fastener. FIGS. 3 and 4 illustrate the second of two embodiments of the disclosed inventive concept for a conductive ball stud fastener.

The first of the two embodiments of the conductive ball stud of the disclosed inventive concept is illustrated in sectional view in FIG. 1. With reference thereto, a conductive ball stud, generally illustrated as 10, includes a stud body 12 is provided is attached to an integrally formed stud base 14. The stud base 14 includes an outer surface 15 that may be hexagonally formed or formed in a similar manner so as to accommodate a tool such as a wrench or a socket for attachment to a substrate such as an engine (not shown). The stud body 12 and stud base 14 are composed of a low-cost, non-conductive insulating material that prevents the transference of electric energy.

A conductive metal attachment end 16 extends from the underside of the stud base 14. The conductive metal attachment end 16 is integral with a conductive stem 17 of a conductive tip 18. Electric energy may thus be conveyed from the conductive tip 18 to the conductive metal attachment end 16 via the conductive stem 17. The conductive metal attachment end 16 may be of the free running type or may be a thread-forming screw.

The ball stud 10 of the disclosed inventive concept may be used in a variety of applications for virtually any electrified component removably attachable to a powered substrate, such as a vehicle engine. One such embodiment is represented in FIG. 2 in which a removable electrified component 20 and a support base 22 in the form of an engine component are illustrated in cross-section. The illustrated removable electrified component 20 is, as a non-limiting example, a removable engine cover that includes an electrified element 24 such as an electrified badge. The electrified component 20 includes an outer shell 26 formed from, for example, a rigid polymerized material such as high-density polyethylene (HDPE) to thereby lend strength and durability to the removable electrified component 20. The outer surface 26 is formed during the molding process and may define a color or a mixture of colors.

The core of the removable electrified component 20 is defined by an inner body 28 that is preferably composed of a polymerized material such as polyurethane (PUR). Other polymerized, non-electrically conductive materials may be used in the alternative. The polyurethane is used to overmold the circuitry required to provide power to the removable electrified component 20.

The conductive ball studs 10 and 10' according to the embodiment of FIG. 1 are attached to the support base 22 by, for example, threading. A ball stud receiver pocket 30 is formed in a grommet 31 to releasably receive the ball stud 10. A ball stud receiver pocket 30' is also formed in a grommet 31' to releasably receive the ball stud 10'. The grommets 31 and 31' may be formed from any of several polymerized materials including, but not limited to, nylon.

To provide electrical continuity between the support base 22, the ball stud fasteners 10 and 10', and the electrified element 24, a circuit is required. The circuit includes a pocket contact plate 32 positioned within the ball stud receiver pocket 30 and a pocket contact plate 32' positioned within the ball stud receiver pocket 30'. A flexible circuit line contact 34 and a flexible circuit line contact 34' are formed on the electrified element 24.

To complete the circuit within the electrified component 20, a flexible circuit line 36 is provided to connect the flexible circuit line contact 34 and the pocket contact plate 32 while a flexible circuit line 36' is provided to connect the flexible circuit line contact 34' and the pocket contact plate 32'.

The ball stud 10 provides one contact with the removable electrified component 20 while the ball stud 10' provides the other contact with the removable electrified component 20. A power supply 38 provides power to the electrified element 24 by way of a circuit 40. The circuit 40 includes a hood switch 42, a photoelectric switch 44, a line 46 connecting the ball stud 10 to one pole of the photoelectric switch 44, a line 48 connecting the other pole of the photoelectric switch 44 to the power supply 38, a line 50 connecting the power supply 38 to the hood switch 42, and a line 52 connecting the hood switch 42 to the ball stud 10'.

The continuity of the circuit 40 supplying power to the removable electrified component 20 may be broken in one of two ways. One way is a hood switch 42 which indicates if the vehicle's engine hood (not illustrated) is open or closed. The other way the circuit 40 may be broken is by a photoelectric switch 44 that breaks continuity of the circuit 40 when ambient light is sensed, an event that would ordinarily occur if the removable electrified component 20 is removed from its attached position. Whenever continuity of the circuit 40 is broken by either the hood switch 42 or the photoelectric switch 44 being moved to their open positions, the circuit 40 is de-energized.

The second of the two embodiments of the conductive ball stud of the disclosed inventive concept is illustrated in sectional view in FIG. 3. With reference thereto, a conductive ball stud, generally illustrated as 60, includes a stud body 62 and an integrally formed stud base 64. The stud base 64 includes an outer surface 66 that may be hexagonally formed or formed in a similar manner so as to accommodate a tool such as a wrench or a socket for attachment to a substrate such as an engine (not shown). The stud body 62 and stud base 64 are composed of a low-cost, non-conductive insulating material that prevents the transference of electric energy. A fixed conductive metal attachment end 66 extends from the underside of the stud base 64. The fixed conductive metal attachment end 66 may be of the free running type or may be a thread-forming screw.

The conductive metal attachment end 66 is integrally associated with a conductive contact base 68 that is fixed in the stud base 64. The conductive contact base 68 includes a fixed base contact plate 70.

An axially movable conductive tip assembly 72 is movable within the stud body 62. The axially movable conductive tip assembly 72 includes a conductive tip 74, a conductive stem 76, and a movable contact plate 78. A biasing element such as a spring 79 is provided between the upper surface of the stud base 64 and the underside of the movable contact plate 78 to provide a biasing force that maintains the axially movable conductive tip assembly 72 in its out-of-contact position as illustrated unless acted upon by a force, such as by attachment of an electrified component. Electric energy may thus be conveyed from the conductive metal attachment end 66 to the conductive tip 74 when the biasing force of the spring 79 is overcome and the circuit is closed.

The conductive ball stud 60 of the disclosed inventive concept may be used in a variety of applications for virtually any electrified component removably attachable to a powered substrate, such as a vehicle engine. One such embodiment is represented in FIG. 4 in which a removable electrified component 80 and a support base 82 in the form of an engine component are illustrated in cross-section. The illustrated removable electrified component 80 is, again as a non-limiting example, a removable engine cover that includes an electrified element 84 such as an electrified badge. The electrified component 80 includes an outer shell 86 formed from, for example, a rigid polymerized material such as high-density polyethylene (HDPE) to thereby lend strength and durability to the removable electrified component 80. The outer surface 86 is formed during the molding process and may define a color or a mixture of colors.

The core of the removable electrified component 80 is defined by an inner body 88 that is preferably composed of a polymerized material such as polyurethane (PUR). Other polymerized, non-electrically conductive materials may be used in the alternative. The polyurethane is used to overmold the circuitry required to provide power to the removable electrified component 80.

The conductive ball studs 60 and 60' according to the embodiment of FIG. 3 are attached to the support base 82 by, for example, threading. A ball stud receiver pocket 90 is formed in a grommet 91 to releasably receive the ball stud 60. A ball stud receiver pocket 90' is also formed in a grommet 91' to releasably receive the ball stud 60'. The grommets 91 and 91' may be formed from any of several polymerized materials including, but not limited to, nylon.

To provide electrical continuity between the support base 82, the ball stud fasteners 60 and 60', and the electrified element 84, a circuit 92 is required. The circuit 92 includes a pocket contact plate 93 positioned within the ball stud receiver pocket 90 and a pocket contact plate 93' positioned within the ball stud receiver pocket 90'. A flexible circuit line contact 94 and a flexible circuit line contact 94' are formed on the removable electrified component 80.

To complete the circuit within the removable electrified component 80, a flexible circuit line 96 is provided to connect the flexible circuit line contact 94 and the pocket contact plate 93 while a flexible circuit line 96' is provided to connect the flexible circuit line contact 94' and the pocket contact plate 93'.

The ball stud 60 provides one contact with the removable electrified component 80 while the ball stud 60' provides the other contact with the removable electrified component 80. A power supply 98 provides power to the removable electrified component 80 by way of a circuit 100. The circuit 100 includes an engine hood switch 102, a line 104 connecting the ball stud 60 to one pole of the power supply 98, a line 106 connecting power supply 98 to the hood switch 102, and a line 108 connecting the hood switch 102 to the ball stud 60'.

The continuity of the circuit 92 supplying power to the electrified element 84 may be broken in one of two ways. One way is a hood switch 102 which indicates if the vehicle's engine hood (not illustrated) is open or closed. The other way the circuit 92 may be broken is by movement of the axially movable conductive tip assembly 72 between its open position which would be the case when the removable electrified component 80 is unattached relative to the support base 82 and its closed position which would be the case when the removable electrified component 80 is in its attached to the support base 82.

The conductive ball stud fastener arrangement of the disclosed inventive concept provides for ease of removal and reattachment of virtually any removably attachable electrified component. As noted, the component may be any of a broad variety of electrified components for attachment to and removal from a substrate that is also a power supply. The conductive ball stud fastener arrangement of the disclosed inventive concept provides a cost-effective, easy to manufacture and easy to attach response to a market in which no real practical alternative exists.

Thus, the disclosed invention as set forth above overcomes the challenges faced by known systems for attaching electrified components. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An attachment assembly comprising:
   an electrified component having a grommet and a component electric circuit including an electrified element and an electric contact in said grommet;
   a substrate having a substrate electric circuit;
   a conductive ball stud including a conductive stem and a non-conductive, insulating body encompassing said stem, said stud further including a conductive anchor associated with said stem attached to said substrate circuit; and
   a circuit-breaking assembly associated with said stud.

2. The attachment assembly according to claim 1, wherein said electric circuit-breaking assembly includes a photoelectric switch for energizing and de-energizing said substrate electric circuit in respective response to the absence or presence of ambient light.

3. The attachment assembly according to claim 1, wherein said circuit-breaking assembly is an axially movable conductive tip assembly incorporated into said conductive ball stud.

4. The attachment assembly according to claim 3, wherein said conductive stem is an axially movable conductive stem, said axially movable conductive stem having a conductive tip and being part of said axially movable conductive tip assembly, said conductive stem and said conductive tip being axially movable relative to said conductive ball stud body.

5. The attachment assembly according to claim 4, wherein said axially movable conductive stem includes a first end and a second end, said conductive tip being attached to said first end, and wherein said second end includes a movable contact plate.

6. The attachment assembly according to claim 5, wherein said conductive anchor includes a substrate engagement end and a movable contact plate contacting end, said movable contact plate contacting end having a fixed base contact plate formed thereon, said movable plate of said axially movable conductive stem being movable between a circuit completing position in which said movable contact plate and said fixed base contact plate are in contact and a circuit breaking position in which said movable contact plate and said fixed base contact plate are not in contact.

7. The attachment assembly according to claim 6, wherein said body of said conductive ball stud includes a base and wherein said ball stud further includes a biasing member positioned between said base and said movable contact plate.

8. The attachment assembly according to claim 1, wherein said electric circuit of said substrate further including a power source.

9. An attachment assembly comprising:
   an electrified component having a grommet and a component electric circuit including an electrified element and an electric contact in said grommet;
   a power-supplying substrate having a substrate electric circuit;
   a conductive ball stud including a conductive anchor for attachment to said substrate circuit; and
   a circuit-breaking assembly associated with said stud selected from the group consisting of a photoelectric switch and an axially movable conductive tip incorporated in said stud.

10. The attachment assembly according to claim 9, wherein said photoelectric switch energizes and de-energizes said substrate electric circuit in respective response to the absence or presence of ambient light.

11. The attachment assembly according to claim 10, wherein said circuit-breaking assembly is an axially movable conductive tip assembly incorporated into said conductive ball stud.

12. The attachment assembly according to claim 11, wherein said conductive stem is an axially movable conductive stem, said axially movable conductive stem and said conductive tip are part of said axially movable conductive tip assembly, said conductive stem and said conductive tip being axially movable relative to said conductive ball stud body.

13. The attachment assembly according to claim 12, wherein said axially movable conductive stem includes a first end and a second end, said conductive tip being attached to said first end, and wherein said second end includes a movable contact plate.

14. The attachment assembly according to claim 13, wherein said conductive anchor includes a substrate engagement end and a movable contact plate contacting end, said movable contact plate contacting end having a fixed base contact plate formed thereon, said movable plate of said axially movable conductive stem being movable between a circuit completing position in which said movable contact plate and said fixed base contact plate are in contact and a circuit breaking position in which said movable contact plate and said fixed base contact plate are not in contact.

15. The attachment assembly according to claim 14, wherein said body of said conductive ball stud includes a base and wherein said ball stud further includes a biasing member positioned between said base and said movable contact plate.

16. The attachment assembly of claim 9 wherein said conductive ball stud includes a conductive stem having a conductive tip and an insulating body formed of a non-conductive material encompassing said stem.

17. The attachment assembly according to claim 9, wherein said electric circuit of said substrate further including a power source.

18. A method for removable attachment of an electrified component having an electrified element to a power-supplying substrate, the method comprising:
   forming an electrified component having a grommet and a component electric circuit including an electrified element and an electric contact in said grommet;
   forming a conductive ball stud including a conductive anchor for attachment to the power-supplying substrate;
   forming a circuit-breaking assembly associated with said stud selected from the group consisting of a photoelectric switch and an axially movable conductive tip incorporated in said ball stud;
   attaching said electrified component to said power-supplying substrate by moving said grommet of said electrified component into position over said conductive ball stud and pushing said electrified component onto said conductive ball stud so that said electric contact in said grommet and said conductive ball stud make contact, thereby closing the circuit between said power-supplying substrate and said electrified element; and
   removing said electrified component from said power-supplying substrate by lifting said grommet off of said conductive ball stud, thereby breaking the circuit between said power-supplying substrate and said electrified element.

19. The method for removable attachment of an electrified component of claim 18 wherein said conductive ball stud includes a conductive stem having a conductive tip and an insulating body formed of a non-conductive material encompassing said stem.

* * * * *